United States Patent [19]

Columbus et al.

[11] Patent Number: 5,284,897
[45] Date of Patent: Feb. 8, 1994

[54] THIXOTROPIC ADHESIVE GEL

[75] Inventors: Peter S. Columbus, Melville, N.Y.; John Anderson, Hilliard; Yogeshbhai B. Patel, Gahana, both of Ohio

[73] Assignee: Borden, Inc., Columbus, Ohio

[21] Appl. No.: 976,553

[22] Filed: Nov. 16, 1992

[51] Int. Cl.$^5$ .............................. C08K 3/04; C08L 1/26
[52] U.S. Cl. ........................... 524/459; 524/44; 524/45; 524/55; 524/57; 524/916
[58] Field of Search ................ 524/44, 45, 55, 57, 524/459, 916; 252/315.1

[56] References Cited

U.S. PATENT DOCUMENTS

| | | | |
|---|---|---|---|
| 3,442,845 | 5/1969 | Columbus et al. | 524/388 |
| 3,896,073 | 7/1975 | Smith | 524/460 |
| 4,251,400 | 2/1981 | Columbus | 524/24 |
| 4,722,954 | 2/1988 | Hallworth | 524/55 |
| 4,967,839 | 11/1990 | Carpenter et al. | 166/293 |
| 5,190,997 | 3/1973 | Lindermann et al. | 524/44 |

FOREIGN PATENT DOCUMENTS 0210052  1/1987  European Pat. Off. .

OTHER PUBLICATIONS

Handbook of Water Soluble Gums and Resins by R. L. Davidson, 1980, McGraw Hill, pp. 20-18, 20-19, 20-20, 21-15 and 21-16.
Kelzan, Xanthan Gum, (Technical Bulletin DB-15) of Merck & Co.
Kelco Xanthan Gum, Third Edition of Kelco, a division of Merck & Co.

*Primary Examiner*—George F. Lesmes
*Assistant Examiner*—Blaine Copenheaver
*Attorney, Agent, or Firm*—George P. Maskas; Kenneth P. Van Wyck; Dennis H. Rainear

[57] ABSTRACT

A water based thixotropic adhesive gel is disclosed which consists essentially of: water; partially hydrolyzed polyvinyl alcohol, or wherein a portion of the polyvinyl alcohol is replaced with polyvinylpyrrolidone; a water-soluble high viscosity thickening agent polymer which is compatible with the polyvinyl alcohol and which imparts thixotropic properties to the gel; a water-soluble plasticizer for the polyvinyl alcohol; and a watersoluble defoamer in proportion of ingredients so that the viscosity of the adhesive will break down when a flexible tube or squeeze bottle dispenser is finger-pressed and have a sufficiently low viscosity to allow for easy extrusion from an orifice having a diameter of about 0.06 to 0.15 inches. When pressure is released, after the desired amount of adhesive has flown out of the dispenser, the adhesive quickly reverts to very close to its original gel state so that it will not run on a vertical surface on porous and semiporous surfaces such as paper. An article of manufacture is also provided whereby the adhesive gel containing the above ingredients is in a flexible dispenser from which the adhesive can be dispensed by finger-pressure.

13 Claims, 2 Drawing Sheets

THIXOTROPIC ADHESIVE GEL

BACKGROUND OF THE INVENTION

1. Field of the Invention

This invention relates to a clear, thixotropic, water based general purpose, polyvinyl alcohol adhesive gel for porous and semiporous substrates such as paper, card board, cloth and wood.

2. Background Art

Many different general purpose adhesives are available for adhering porous and semiporous substrates such as paper. However, such adhesives have shortcomings for use in projects which are performed on wall boards and other vertical surfaces such as in a class room by young children.

The adhesive gels of this invention consist essentially of: water; a partially hydrolyzed polyvinyl alcohol: a water-soluble thickening agent polymer which is compatible with polyvinyl alcohol; a water-soluble defoamer; and a water-soluble plasticizer for the polyvinyl alcohol which does not destroy the clarity of the gel. Optionally, other ingredients can be added which do not destroy the advantageous properties of the gel. Compatible preservatives are generally added to the gel.

The Handbook of Water-Soluble Gums and Resins by R. L. Davidson, 1980 by Mc Graw-Hill, Inc. pages 20-20 discloses partially hydrolyzed polyvinyl alcohol as an adhesive and page 20-18 discloses the use of certain gelling agents to control penetration of polyvinyl alcohol solutions into porous substrates or to prevent run-off of coating by dipping whereas page 20-19 of that reference discloses the use of an antifoam agent with polyvinyl alcohol. Pages 21-15 and 21-16 of the Handbook reference describe adhesive properties of polyvinylpyrrolidone (PVP). Among other shortcomings, these references do not mention the use of thixotropic agents with polyvinyl alcohol nor proportions of ingredients used in obtaining the advantageous properties of this invention.

U.S. Pat. No. 3,442,845 of May 6, 1969 to P. Columbus et al. relates to polyvinyl acetate adhesives which are redispersible in cold or hot water. The adhesive compositions of the 845 patent use polyvinyl alcohol, water-soluble gums, and cellulose ethers as anti-coalescing agents for the polyvinyl acetate. Propylene glycol and other polyhydroxy compounds are mentioned as plasticizers for polyvinyl alcohol. However, among other shortcomings in relation to the adhesive gel of this invention, the adhesive of the 845 patent does not have the thixotropic properties, clarity, or rate of set of the adhesive gel of this invention.

U.S Pat. No. 4,251,400 of Feb. 17, 1981 to P. Columbus also relates to a polyvinyl acetate adhesive which is redispersible in hot and cold water in the dried film form and which uses polyvinylpyrrolidone and a nonvolatile, water-soluble, plasticizer as the anti-coalescing agent. In addition to the polyvinyl acetate and polyvinylpyrrolidone that patent also mentions the use of polyvinyl alcohol, propylene glycol, as well as water-soluble ethers in the adhesive composition. The adhesive of the 400 patent lacks many of the properties of the adhesive gel of this invention such as rate of set, clarity, and the thixotropic properties.

A mucilage containing about 83% of water; 14% of partially hydrolyzed polyvinyl alcohol; 0.2% of a water-soluble polyalkoxylated polyether defoamer; 1.8% of propylene glycol and a total of about 0.25% of boric acid and citric acid as thickeners is a well known commercial product. Again, this mucilage lacks properties of the adhesive gel of this invention such as the thixotropy and wet tack.

European Patent Application Publication Number 0210052 to Locktite which was published on Jan. 28, 1987 relates to various tubes for dispensing reactive adhesives such as cyanoacrylate at a rate of one or two drops at a time. The patent mentions resilient plastic tube dispensers and broadly states that the adhesive can be thixotropic.

SUMMARY OF THE INVENTION

In one aspect of the invention, a clear, water based polyvinyl alcohol adhesive gel is provided which contains a water-soluble high viscosity thickening agent polymer which provides thixotropic properties to the gel, a water-soluble plasticizer for the adhesive polymer, and a water-soluble defoamer. Due to its thixotropic properties, the viscosity of the adhesive will break down when a flexible tube or squeeze bottle is finger-pressed and have a sufficiently low viscosity to allow for easy extrusion from a small orifice such as one having a diameter of about 0.06 to 0.15 inches. When pressure is released after the desired amount of adhesive flows out of the orifice, the adhesive quickly reverts to very close to its original gel state so that a horizontal line of the gel will not run when applied to a vertical surface of a porous substrate such as paper.

In another aspect, the adhesive gel is crystal clear or transparent.

In still another aspect, the adhesive gel has a strong wet tack with a low rate of set. This holds a second substrate in position with a first substrate in a vertical plane after contact of the substrates with the gel while permitting sliding and repositioning of the second substrate for a prolonged period of time prior to formation of permanent adhesion and fiber tearing bonds due to setting of the adhesive.

In a further aspect of the invention, a portion of the polyvinyl alcohol adhesive polymer is replaced with polyvinylpyrrolidone.

In still another aspect, an article of manufacture is provided whereby the adhesive gel of this invention is contained in a flexible dispenser having an orifice of about 0.06 to 0.15 inches in diameter from which the adhesive can be dispensed by fingerpressure.

In still a further aspect, the orifice of the flexible dispenser is interrelated with the thixotropic index and viscosity of the gel to permit extrusion of the gel from the flexible dispenser by applying finger-pressure to the dispenser and wherein the extruded gel forms a bead which does not run when applied in a horizontal line on paper in a vertical plane.

Additional aspects of the invention will be evident from a reading of the entire specification and claims.

Advantages of the invention include: (1) The adhesive gel will not run when applied to porous and semiporous vertical surfaces and will not spill when used as a general purpose school glue. (2) The adhesive gel extrudes easily and in a steady stream from a small orifice when a flexible tube or squeeze bottle is finger pressed and reverts to gel when finger-pressure is released. (3) The combination of adhesive gel and small dispenser opening, e.g. from about 0.06 inches to 0.15 inches in diameter, minimizes or eliminates wrinkling of paper upon drying of the adhesive. (4) The adhesive in a clear resilient plastic dispenser can be viewed within the dispenser as clear which may include a tint of color. (5) The adhesive gel is preferably crystal clear or has a clear colored tint and provides a clear dry film. (6) The dry adhesive film is flexible and will not crack on bending. (7) The adhesive gel has a strong wet-tack to hold paper surfaces together while drying. (8) It has a long rate of set so as to permit sliding and positioning of substrates before fiber tearing permanent adhesive bonds are developed. (9) The adhesive gel as well as dried films thereof will launder-out in hot or cold water. (10) The adhesive gel can be tinted easily with non-toxic water-soluble dyes. (11) The adhesive gel is non-toxic and is not an irritant to the skin and eyes as defined in the Federal Hazardous Substances Act.

DETAILED DESCRIPTION OF THE INVENTION

Figure 1:
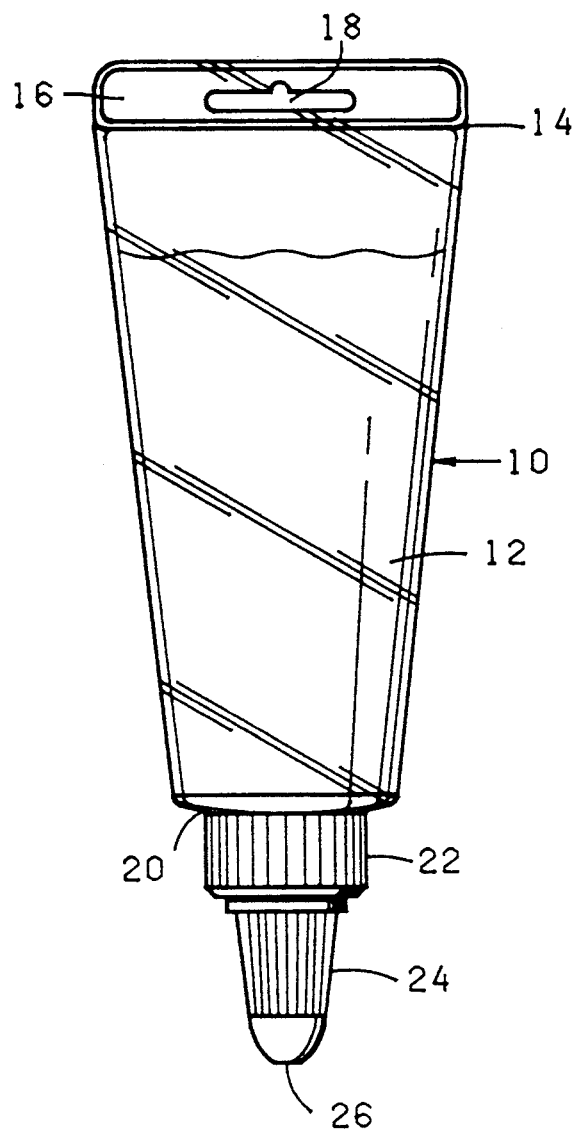
FIG. 1 is a side elevation of a flexible tube dispenser containing the adhesive gel of this invention.

FIG. 1 shows a conventional, flexible plastic, low density, polyethylene tube dispenser 10 having a clear hollow tube portion 12 which has a capacity of about 3 fluid ounces and a crimped, closed end 14. The wall thickness of the polyethylene is 0.018 inches. The closed end beyond crimp 14 has an extending flap 16 which has a cut out portion 18 so that the dispenser 10 can be hung up and displayed or stored. The dispensing end 20 of tube 12 has a conventional screw threaded dispenser closure cap 22 which can effect opening and closing of orifice 26 by holding cap 22 in place while twisting cap end 24. Dispenser 10 contains adhesive gel 40 of this invention and the adhesive 40 in contact with tube 12 provide a clear appearance when the dispenser is viewed.

Figure 2:
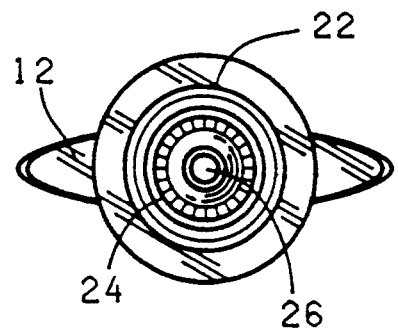
FIG. 2 is a plan view of that shown in FIG. 1.

FIG. 2 more clearly shows dispenser opening 26 at the end of cap 24.

Figure 3:
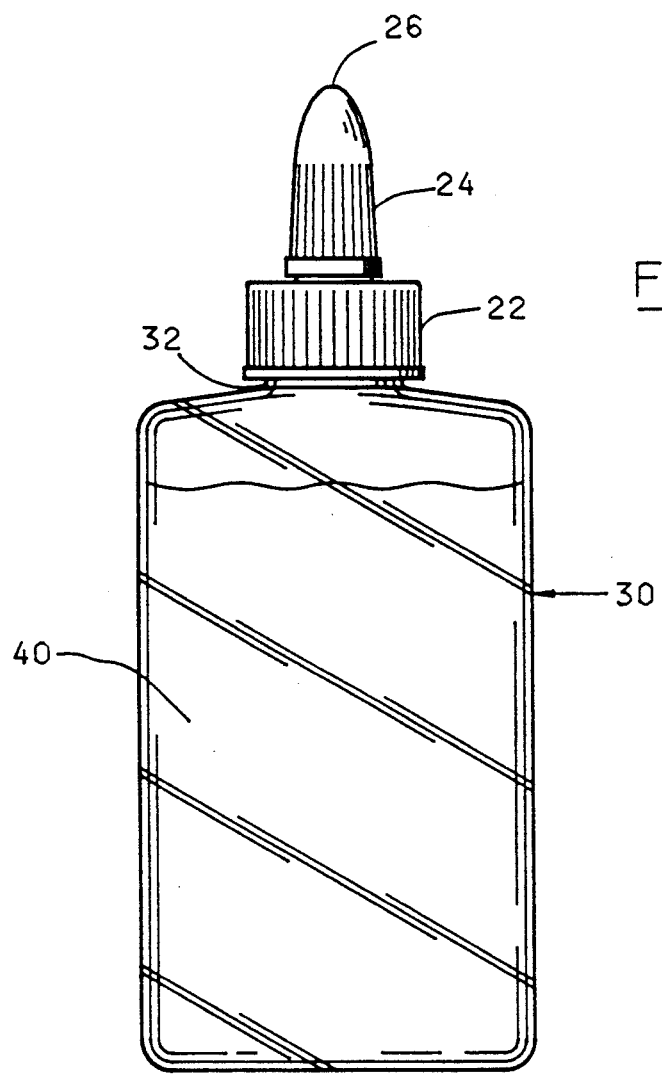
FIG. 3 is a side elevation of a flexible squeeze bottle containing the adhesive gel of this invention.

FIG. 3 shows a clear, conventional, flexible plastic, low density polyethylene squeeze bottle 30 which has a capacity of 4 fluid ounces. Bottle 30 has neck portion 32 which has an open end with conventional screw threads, not shown. Conventional dispenser closure cap 22 has internal screw threads which mate with those on neck portion 32. Cap 22 can effect opening and closing of orifice 26 by twisting of the cap end 24 as with FIGS. 1 and 2. Dispenser bottle 30 contains clear gel adhesive 40. The clarity or transparency of the portion of bottle 30 containing the adhesive 40 is similar to that of FIG. 1.

Figure 4:
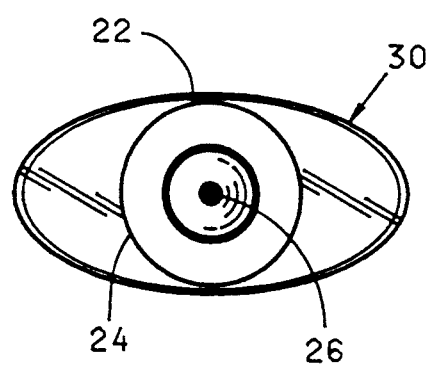
FIG. 4 is a plan view of that shown in FIG. 3.

FIG. 4 more clearly shows dispenser opening 26 at the end of cap 24.

In place of a flexible plastic tube or squeeze bottle, other dispensers such as deformable, ductile, metal tubes can be used; although such tubes do not provide for clarity.

The preferred adhesive gels of this invention are clear. The term "clear" is used herein in contrast to opaque. The term "clear" includes transparent, i.e., see through, as well as translucent.

The term "water-soluble" as used herein refers to solutions of either solids or liquids which are soluble or miscible in water to provide a solution which is clear at the concentration employed.

The "thixotropic index" is the difference in viscosity for the gel from an undisturbed state to that wherein the gel is being displaced by force. The term "thixotropic" as used herein is also meant to cover pseudoplastic. The thixotropic index used in this invention permits extrusion of the gel from the dispenser opening by use of finger-pressure on a flexible dispenser such as a tube or squeeze bottle. The adhesive rapidly reverts to a higher viscosity after extrusion from the orifice. The adhesive gel does not run, i.e. spread without the application of external force, when applied to paper in a vertical plane when extruded through the small orifices of the dispensers used in this invention, although there can be a slight amount of creep such as that of less than 0.15 inches and preferably less than 0.1 inches. The smaller orifices in the dispensers such as those of less than 0.1 inches in diameter, e.g., 0.073 inches in diameter minimize any creep.

The thixotropic index for the adhesive gel of this invention varies from about 1.5 to 4.5 preferably about 1.5 to 4 and particularly 1.8 to 2.5. The thixotropic index used herein is obtained by dividing the viscosity reading of the gel at 2 RPM (revolutions per minute) by the viscosity reading at 20 RPM by use of an RVF Brookfield viscometer using a number 6 spindle at 25° C. The viscosity readings are taken after the gel has been at rest e.g undisturbed, for a period of time such as 12 hours after any agitation or other disturbance of the gel structure. It should be noted that different methods for measuring thixotropic index will give different results.

The adhesive gels of this invention have a viscosity of about 30,000 cps (centipoise) to 100,000 cps at 25° C. and preferably about 50,000 cps to 90,000 cps at 25° C. as measured with an RVF Brookfield viscometer by use of a number 6 spindle at 2 RPM (revolutions per minute). When measured at 20 RPM with an RVF Brookfield viscometer at 25° C. by use of a No. 6 spindle, the viscosity is about 15,000 cps to 60,000 cps, preferably about 20,000 cps to 40,000 cps, provided that the thixotropic index is within the ranges set forth herein.

The major ingredient in the adhesive gel of this invention is water. The quantity of water can vary over a broad range such as that from about 70% to 93% by weight of the adhesive gel, preferably 75% to 93% and particularly from about 80% to 90% by weight thereof.

Polyvinyl Alcohol Adhesive Polymer

The adhesive agent used in this invention is partially hydrolyzed polyvinyl alcohol or such polyvinyl alcohol with polyvinylpyrrolidone (PVP) wherein the PVP replaces up to about half of the polyvinyl alcohol. The polyvinyl alcohol will normally have a molecular weight of about 25,000 to 100,000 and preferably about 40,000 to 80,000. The viscosity of the polyvinyl alcohol can vary over a wide range such as that of about 5 or 6 cps, which is referred to in the art as low viscosity, to 40 to 50 cps, which is referred to in the art as high viscosity as measured with an LVF Brookfield viscometer using a number 1 spindle at 60 RPM at 20° C. for a 4% aqueous solution. The preferred degree of hydrolysis for the partially hydrolyzed polyvinyl alcohol is 87% to 89%.

The PVP can have a molecular weight, expressed as a K value, which varies over a wide range such as that of a K value of about 26 to 100.

The quantity of polyvinyl alcohol or polyvinyl alcohol together with PVP in the gel can vary over a wide range such as that of from about 5% to 25% by weight of the adhesive gel, preferably from about 5% to 20% and particularly 10% to 15% by weight of the adhesive gel.

The High Viscosity Thickening Agent Polymer

The high viscosity thickening agent polymer can be any watersoluble thickener polymer which is compatible with polyvinyl alcohol and which imparts thixotropic or pseudoplastic properties within the thixotropic index and viscosity ranges of the adhesive gels of this invention. By "compatible" we mean miscible in that it does not cause separation of the ingredients in the gel. Illustrative of the high viscosity thickening agent polymer there can be mentioned the sodium salt of carboxymethylcellulose, also referred to herein simply as CMC, sodium alginate, and xanthan gum. The quantity of the thickener is that which is sufficient to provide the adhesive gel with the desired thixotropic index and viscosity. Such quantity will generally vary from about 0.5% to 1.5% by weight of the adhesive gel and preferably from 0.85% to 1.25% by weight of the adhesive gel.

The Water-Soluble Plasticizer

Any water-soluble plasticizer for the polyvinyl alcohol which does not destroy the clarity of the gel is suitable for use in this invention. Such plasticizers soften the polyvinyl alcohol, make the adhesive stickier, and assist in making the dried film easier to wash out of clothing. Illustrative of such plasticizers there can be mentioned: alkanes having from 2 to 5 carbon atoms and 2 to 3 hydroxyl groups such as: propylene glycol; glycerol; ethylene glycol; and diethylene glycol; although ethylene glycol and diethylene glycol can have some toxic properties. The quantity of the water-soluble plasticizer is that which is sufficient to plasticize the polyvinyl alcohol and will generally vary from about 0.5 to 3% by weight of the adhesive gel.

The Water-Soluble Defoamer

Conventional water-soluble defoamers can be used in this invention such as the polyalkoxylated polyethers e.g., butoxy polyoxyethylene-propoxyl propylene glycol. Silane defoamers can also be used but they can adversely affect transparency of the gel. The quantity of the defoamer is that which is sufficient to eliminate air bubbles in the gel in a concentration which destroys the clarity of the gel. Generally, the quantity of the defoamer varies from about 0.05% to 0.35% by weight of the gel composition. The defoamer also maintains density of the gel, prevents excessive foam in the manufacturing process, and facilitates filling of the dispensers with the gel.

In operation of the dispenser, the cap end 24 is twisted so as to open the orifice 26 and finger-pressure between the thumb and forefinger or the thumb and fingers is used to dispense the gel 40 from the dispenser tube 12 or dispenser squeeze bottle 30 on to a substrate such as paper. The dispenser cap orifice 26 has a diameter of about 0.06 to 0.15 inches, preferably 0.07 to 0.10 inches and particularly about 0.07 to 0.08 inches. The thixotropic gel adhesive 40 flows out of the cap orifice 26 in a steady stream on being finger-pressed due to its thixotropic properties in spite of its high viscosity in the undisturbed state. The dispensing opening need not be circular, provided that such opening has a cross section which in relation to the thixotropic ratio and viscosity of the gel permits extrusion of the gel by fingerpressure on the flexible dispenser while a bead of the extruded gel in a horizontal line on a vertically mounted sheet of paper does not run. The area of such opening should be from about 0.011 to about 0.12 square inches.

When applied to a substrate in the vertical plane, the gel does not run and has a minimum amount of creep due to the thixotropic properties of the gel. Any such creep is generally less than 0.15 inches and more often less than 0.1 inches. Due to the ability of the thixotropic gel to be applied through a small dispenser opening, a thin glue line can be provided on a first substrate such as construction paper which minimizes the amount of adhesive as well as wrinkling of paper upon drying. When a second substrates such as a second piece of construction paper is pressed over the first piece in order to be adhered thereto, the high tack of the gel holds the second substrate in place on the vertical surface. The slow rate of set permits a prolonged period of time for positioning the second substrate such as by sliding of the second surface over the first before fiber tearing adhesive bonds develop between the two substrates which permanently hold the pieces in place.

In order that those skilled in the art may more fully understand the invention presented herein, the following examples are set forth. All parts and percentages in the examples, as well as elsewhere in this application, are by weight, unless otherwise specifically stated. Also, set forth below are procedures for determining "wet tack" and "rate of set".

PROCEDURE FOR DETERMINING WET TACK

This procedure uses blocks of Grade 1 or Grade 2 white pine with each block being 2 inches long, 0.75 inches high and 1.75 inches wide. The grain of the wood is parallel to the length of the block and the sides which are 0.75 inches high and 2 inches long are planed and smooth. Such sides are referred to herein as test sides. Each test side therefor provides a surface of 1.5 square inches.

A series of tests are performed with the above described blocks of wood with two blocks being required for each test. In each test an eye screw is placed in the center of one of the test sides of each block. Gel adhesive is then placed on the opposite side of the eye screw of one of the test blocks so that it covers the entire 1.5 square inches of surface. The test side of the second block opposite the second block eye screw and the side of the first block having the glue thereon are pressed against each other in sliding relationship while being placed in register so that the edges of one block do not extend beyond the edges of the other. A scale is attached to the eye screw of the first block whereas a weight is attached to the eye screw of the second block. The scale is then lifted upwardly by the operator and the two blocks are lifted vertically so as to lift the weight. Thus, The operator lifts the scale by hand which in turn lifts the first block through the eye screw. This in turn lifts the second block due to the wet tack of the adhesive which in turn lifts the weight which is attached to the second block eye screw. This test is repeated with clean blocks of wood and the weight is increased each time until the adhesive between the two blocks fails to lift the second block and its attached weight. The last weight which was lifted in this test is referred to as the quantity of wet tack or simply wet tack of the adhesive. This test measures the wet tack in a direction which is perpendicular to the adhered surfaces. In spite of the lengthy description of this test, it can be performed, and for reliability is performed, rapidly by the operator. The glue, when the wet tack is measured between the blocks of wood is very close to the physical and chemical condition of the glue when it left the dispenser orifice. The wet tack is a measure of what is often referred to as the grabbing power of the adhesive. A another in a vertical plane, otherwise, the substrate which is not held in place but rather depends on the wet glue for positioning would slip off of the vertical surface of the first substrate. The wet tack of the gel of this invention preferably varies from about 225 g per square inch to over 600 grams per square inch and preferably from about 250 to 500 grams per square inch.

PROCEDURE FOR DETERMINING RATE OF SET

Determinations for the rate of set are performed on a white paper pad. A glue line is placed on smooth white paper of a 5.5 × 8.5 inches paper pad. The single glue line is placed in about the middle of the pad parallel to the length of the paper. This glue is then spread evenly by the use of a No. 22, WIRE-CATOR which is supplied by the Leneta Company. The WIRE-CATOR is also referred to as a wire wrap rod. The WIRE-CATOR draws down a uniform thickness of film from the single glue line. Use of the No. 22 WIRE-CATOR draws down a glue line to a thickness of 1.5 mil.

A second sheet of the same paper has one of its narrow ends raised so that it can be grasped by the fingers. The second sheet is pressed over the first sheet. The two pieces are then slowly pulled apart by lifting the raised end of the second sheet and holding the first sheet down in place. The time that it takes to encounter fiber tearing bond is the rate of set. The preferred rate of set for the gels of this invention is from about 16 seconds to 35 seconds and preferably from about 18 to 32 seconds.

The values for both the set tack and rate of set recited herein are obtained at 25° C. and a relative humidity of 35%.

EXAMPLE 1

This example shows the composition, preparation and properties of an adhesive gel of this invention as well as use of an article of this invention.

| Ingredient | Parts By Weight |
| --- | --- |
| Deionized water | 83.51 |
| Polyvinyl alcohol[1] | 13.33 |
| Sodium salt of Carboxymethylcellulose[2] | 1.00 |
| DEFOAMER[3] | 0.25 |
| Ethyl parahydroxybenzoate | 0.05 |
| Benzoic Acid | 0.10 |
| Propylene Glycol | 1.75 |
| Blue dye[4] | 0.01 |

[1]VINOL 523 which is a partially hydrolyzed polyvinyl alcohol supplied by Air Products and Chemicals, Inc.
[2]CMC 7HX4 which is supplied by the Aqualon Company of Wilmington, Delaware.
[3]DEFOAMER 622 which is monofunctional polyalkoxylated polyether defoamer supplied by the Thomas W. Dunn Corp of Ridgefield, N.J.
[4]No. 5601, FD&C Blue No. 1 which is supplied by Warner Jenkinson Cosmetic Colors of South Plainsfield, New Jersey.

The adhesive of Example 1 was prepared by slowly adding the polyvinyl alcohol and CMC to water under fast agitation in a jacketed tank equipped with agitators. The CMC is preferably dry blended with a portion of the polyvinyl alcohol before addition to the water. The defoamer was then added. A small portion of the total amount of water in the gel can be obtained from steam condensation when the mixture is heated in contact with steam. The ethyl parahydroxybenzoate and benzoic acid were then mixed in the composition and the temperature of the mixture was raised to 85° C. to 90° C. with slow agitation for about 15 to 20 minutes until the composition was smooth and homogeneous. The composition was then cooled to 50° C. with continued slow agitation. The blue dye was then added which had been prepared in advance by mixing 2 parts of the dye with 98 parts of water. Mixing was continued until the batch color was uniform.

The adhesive was then filled into 3 fluid ounce clear, low density polyethylene tubes 12 having a cap 22 and nozzle 24 and opening 26 of 0.073 inches in diameter. After filling, the back end of tubes 12 are heat sealed to form a crimp 14 having flap 16 extending therefrom as shown in FIG. 1 and FIG. 2. The portion of the tube 12 in direct contact with the gel 40 was transparent with a slight blue tint. The portion of tube 12 which was not in direct contact with the gel was translucent.

All of the examples set forth herein were performed in much the same manner as with EXAMPLE 1.

The adhesive gel of Example 1 was transparent with a blue tint, easily dispensed with finger-pressure from the resilient plastic tube 12 having an orifice 26 of 0.073 inches diameter. It had wet tack of 435 g (grams) per square inch and a time of set of 25 seconds. It was free of air bubbles, and when dispensed from such tube and orifice on to a sheet of paper held vertically, it formed a uniform, thin, horizontal bead of adhesive which did not run and formed fiber tearing adhesive bonds on drying to a clear film. The gel can be dispensed in a steady stream through the dispenser orifice. The strong wet tack held a second sheet of paper in place on the vertical surface while the lengthy time of set permitted sliding and repositioning of the second sheet on the first before permanent adhesive bonds were formed. The gel washed out of clothing both before and after drying. This product exhibited all the advantages set forth in the hereinabove Summary of Invention. It had a thixotropic index of about 2. The viscosity of the adhesive gel when measured at 25° C. with an RVF Brookfield viscometer with a No. 6 spindle was as follows:

Initially, after manufacture, and at a speed 2 of RPM, a viscosity of 50,000 to 60,000 cps.

Initially, after manufacture, and at a speed of 20 RPM, a viscosity of 24,000 to 28,000 cps.

After standing for about 12 hours and at a speed of 2 RPM, a viscosity of 70,000 to 80,000 cps.

After standing for about 12 hours and at a speed of 20 RPM, a viscosity of 30,000 to 40,000 cps.

After one month from manufacture, the viscosity was not over 100,000 cps when measured at a speed of 2 RPM. The adhesive of this invention had a pH of 4.8.

EXAMPLE 2

This example provides another formulation having the advantageous properties of this invention and illustrates the use of a lower viscosity polyvinyl alcohol. The flue dye, CMC and defoamer were the same as in EXAMPLE 1.

| Ingredient | Parts By Weight |
| --- | --- |
| Deionized water | 76.84 |

| Ingredient | Parts By Weight |
|---|---|
| Blue dye | 0.01 |
| Polyvinyl alcohol* | 20.00 |
| CMC | 1.0 |
| Defoamer | 0.25 |
| Ethyl parahydroxybenzoate | 0.05 |
| Benzoic acid | 0.10 |
| Propylene glycol | 1.75 |

*VINOL 205 which is a product supplied by Air Products and Chemicals, Inc.

This gel and a viscosity of 67,500 cps at 2 RPM and 21,000 cps AT 20 RPM when measures at 25° C. with a Brookfield RVF viscometer having a No. 6 spindle. The thixotropic index was 2.4 and it had a wet tack of 250 g per square inch.

EXAMPLE 3

This example illustrates the use of smaller quantities of the polyvinyl alcohol and CMC which produced product having the advantageous properties of this invention.

| Ingredient | Parts By Weight |
|---|---|
| Deionized water | 85.4 |
| Blue dye | 0.01 |
| Defoamer | 0.25 |
| Polyvinyl alcohol* | 11.6 |
| CMC | 0.87 |
| Propylene glycol | 1.75 |
| Preservative** | 0.10 |

*VINOL 205 which is a product supplied by Air Products and Chemicals, Inc.
**KATHON LX 1.5 which is a mixture of 5-chloro-2-methyl-4-isothiazolin-3-one and 2-methyl-4-isothiazolin-3-one which is supplied by Rohm and Haas Co.

The blue dye, defoamer and CMC used in EXAMPLE 3 were the same as that of EXAMPLE 1.

EXAMPLE 4

This example illustrates the formula of a composition of this invention which contains a substantial quantity of polyvinylpyrrolidone.

| Ingredient | Parts By Weight |
|---|---|
| Deionized Water | 83.51 |
| Defoamer | 0.25 |
| Polyvinyl alcohol | 6.67 |
| CMC | 1.00 |
| Polyvinylpyrrolidone* | 6.66 |
| Propylene Glycol | 1.75 |
| Blue dye | 0.01 |
| Ethyl parahydroxybenzoate | 0.05 |
| Benzoic acid | 0.10 |

*LUVISCOL K-90 which is supplied by B.A.S.F. Aktiengesellschaft.

The adhesive gel of this EXAMPLE 4 had a viscosity of 35,000 cps at 2 RPM and 20,000 cps at 2 RPM when measured by use of a Brookfield RVF viscometer at 25° C. with a No. 6 spindle. The thixotropic index was 1.75 an the wet tack was 250 g per square inch. The polyvinyl alcohol, CMC, and blue dye were the same as that used in EXAMPLE 1

EXAMPLE 5

This example illustrates a composition of this invention which used xanthan gum as the thickening agent polymer.

| Ingredient | Parts by Weight |
|---|---|
| Deionized water | 83.51 |
| Blue dye | 0.01 |
| Polyvinyl alcohol | 13.33 |
| Xanthan gum[1] | 1.00 |
| Defoamer | 0.25 |
| Ethyl parahydroxybenzoate | 0.05 |
| Benzoic acid | 0.10 |
| Propylene glycol | 1.75 |

[1]KALZAN, an industrial grade xanthan gum supplied by the Kelco Division of Merck & Co.

The gel of example 5 had a viscosity of 62,000 cps and 13,500 cps for a thixotropic index of about 4.6. The viscosity was measured at 25° C. by use of a Brookfield RVF viscometer with a No. 6 spindle. This product had a wet tack of 400 grams per square inch.

EXAMPLE 6

This example shows the use of sodium alginate as the thickening agent polymer for preparing a gel adhesive of this invention. The remaining ingredients are the same as those used in EXAMPLE 1.

| Ingredient | Parts by Weight |
|---|---|
| Deionized water | 83.51 |
| Blue dye | 0.01 |
| Polyvinyl alcohol | 13.33 |
| Sodium alginate* | 1.00 |
| Defoamer | 0.25 |
| Ethyl parahydroxybenzoate | 0.05 |
| Benzoic acid | 0.10 |
| Propylene glycol | 1.75 |

*KELGIN MV which is supplied by the Kelco Division of Merck & Co.

The gel of this EXAMPLE 6 had a viscosity of 35,000 cps and 23,000 cps when measured at 2 RPM and at 20 RPM respectively with a Brookfield RVT viscometer at 25° C. using a No. 6 spindle. It had a thixotropic index of about 1.5 and a wet tack of 335 g per square inch.

EXAMPLE 7

This example shows incompatibility of hydroxypropyl methylcellulose as the thickening agent polymer. This formulation was unsatisfactory since a thick layer of the hydroxymethyl cellulose separated and formed on top of the sample.

| Ingredient | Parts by Weight |
|---|---|
| Deionized water | 83.51 |
| FD&C No. 1 (2% aqueous solution) | 0.01 |
| Polyvinyl alcohol | 13.33 |
| Hydroxypropyl methylcellulose* | 1.00 |
| Defoamer | 0.25 |
| Ethyl parahydroxybenzoate | 0.05 |
| Benzoic acid | 0.10 |
| Propylene glycol | 1.75 |

*METHOCELL K 15 MS which is supplied by the Dow Chemical Co.

Apart from the hydroxypropyl methylcellulose, the remaining ingredients were the same as that of EXAMPLE 1.

EXAMPLE 8

The substitution of hydroxyethyl cellulose for the hydroxymethyl cellulose of the formulation in EXAMPLE 7 also gave unsatisfactory results since a thick layer of the hydroxyethyl cellulose separated out of the formula.

What is claimed is:

1. A clear, thixotropic adhesive gel consisting essentially of:
   A. about 70% to 93% of water;
   B. about 5% to 25% of partially hydrolyzed polyvinyl alcohol;
   C. about 0.5% to 1.5% of a thickening agent polymer compatible with the polyvinyl alcohol selected from the group consisting of sodium carboxymethylcellulose, sodium alginate, and xanthan gum;
   D. about 0.5% to 3% of a water-soluble plasticizer for the polyvinyl alcohol; and
   E. about 0.05% to 0.35% of a water-soluble defoamer.

2. The gel of claim 1 wherein: the quantity of thickening agent is sufficient to provide a thixotropic index of from about 1.5 to 4.5 when viscosity of said gel at 20 RPM is divided into the viscosity at 2 RPM of said gel at 25° C. as measured with an RVF Brookfield viscometer using a number 6 spindle.

3. The gel of claim 1 wherein the thixotropic index is from about

4. The gel of claim 1 having a wet tack of at least about 225 grams per square inch and a rate of set of about 16 to 35 seconds at a temperature of 25° C. and a relative humidity of 35%.

5. The gel of claim 1 wherein the plasticizer is an alkane having from 2 to 5 carbon atoms and from 2 to 3 hydroxyl groups.

6. The gel of claim 1 wherein the defoamer is a monofunctional polyalkoxylated polyether.

7. The gel of claim 1 wherein the gel can be laundered out of clothing in hot or cold water after it has dried.

8. The gel of claim 1 wherein from about 5% to 50% by weight of the polyvinyl alcohol is replaced with polyvinylpyrrolidone.

9. A clear, thixotropic adhesive gel consisting essentially of, by weight:
   A. about 70% to 93% of water;
   B. about 5% to 25% of partially hydrolyzed polyvinyl alcohol;
   C. about 0.5% to 3% of a water soluble plasticizer for the polyvinyl alcohol;
   D. a water soluble defoamer in an amount sufficient to prevent air bubbles from destroying the clarity of the gel; and
   E. about 0.5% to 1.5% of a water soluble thickening agent polymer compatible with the polyvinyl alcohol to impart a thixotropic index to the gel of about 1.5 to 4.5, said thickening agent selected from the group consisting of sodium carboxymethylcellulose, sodium alginate and xanthan gum.

10. The gel of claim 9 wherein the quantity of water is from about 75% to 93% by weight of the gel and the polyvinyl alcohol is from about 5% to 20% by weight of the gel.

11. The gel of claim 9 wherein the thickening agent is sodium carboxymethylcellulose.

12. The gel of claim 9 wherein the thickening agent is xanthan gum.

13. The gel of claim 9 wherein from about 5% to 50% of the polyvinyl alcohol is replaced with polyvinylpyrrolidone.

* * * * *

UNITED STATES PATENT AND TRADEMARK OFFICE
CERTIFICATE OF CORRECTION

PATENT NO. : 5,284,897
DATED : February 8, 1994
INVENTOR(S) : Peter S. COLUMBUS, et al.

It is certified that error appears in the above-identified patent and that said Letters Patent is hereby corrected as shown below:

Column 11:

In claim 3, second line thereof, after "from about" insert -- 1.5 to 4.0. --.

Signed and Sealed this

Twenty-eighth Day of June, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,284,897
DATED : Feb. 8, 1994
INVENTOR(S) : Peter S. COLUMBUS, et al.

It is certified that error appears in the above-identified patent and that said Letters Patent is hereby corrected as shown below:

In Col. 10 line 11, delete "KALZAN" and insert -- KELZAN -- therefor.

In Col. 10, line 47, delete "hydroxymethyl cellulose" and insert -- hydroxypropyl methylcellulose -- therefor.

In Col. 10, line 59, delete "METHOCELL" and insert -- METHOCEL -- therefor.

In Col. 10, line 67, delete "hydroxymethyl cellulose" and insert -- hydroxypropyl methylcellulose -- therefor.

Signed and Sealed this

Eleventh Day of October, 1994

Attest:

BRUCE LEHMAN

*Attesting Officer*     *Commissioner of Patents and Trademarks*